United States Patent [19]

Peddinghaus

[11] Patent Number: 4,664,566

[45] Date of Patent: May 12, 1987

[54] APPARATUS FOR BASELINE DETERMINATION BY HEIGHT OF A ROLLED STEEL SECTION

[76] Inventor: Rolf Peddinghaus, Deterbergerstrasse 25, 5828 Ennepetal - BRD, Fed. Rep. of Germany

[21] Appl. No.: 801,610

[22] Filed: Nov. 25, 1985

[30] Foreign Application Priority Data

Nov. 29, 1984 [DE] Fed. Rep. of Germany ....... 3443513

[51] Int. Cl.$^4$ ............................................. B23B 41/00
[52] U.S. Cl. ........................................ 408/13; 408/88
[58] Field of Search ....................... 408/1, 2, 3, 11, 12, 408/16, 13, 88, 46, 103; 33/181 R; 29/26 A, 57

[56] References Cited

U.S. PATENT DOCUMENTS

1,981,147 11/1934 Moller .............................. 29/57 X

FOREIGN PATENT DOCUMENTS

3136394 3/1983 Fed. Rep. of Germany .

Primary Examiner—Z. R. Bilinsky
Attorney, Agent, or Firm—Karl F. Ross; Herbert Dubno

[57] ABSTRACT

A drilling device includes a frame with a stationary and a movable upright and a transverse beam which connects said uprights with each other along which a drilling unit moves transversely to the advance direction of the workpiece and is set to provide boreholes in accordance to the center of a standard workpiece of nominal height. The workpiece is transported by a roller table and clamped by the movable upright to define a clamping path. Connected to the movable upright is a lever assembly which transmits the horizontal movement of this upright to a vertical bar. The displacement of the vertical bar rotates a horizontal rod which is linked via a crank arm/lever assembly to a transmission bar moved in horizontal direction upon rotation of the rod. The transmission bar is connected to a correction unit which in response to the determination of the clamping path acts on the drilling unit to adjust the latter in dependence on the actual height of the workpiece.

1 Claim, 5 Drawing Figures

APPARATUS FOR BASELINE DETERMINATION BY HEIGHT OF A ROLLED STEEL SECTION

CROSS REFERENCE TO RELATED APPLICATION

This application is related to my commonly owned copending applications Ser. No. 690,147 filed Jan. 10, 1985 (now canceled), Ser. No. 547,743 filed Nov. 1, 1983, and earlier applications copending with the latter which have matured into U.S. Pat. Nos. 4,545,233 and 4,501,507.

FIELD OF THE INVENTION

My present invention relates to an apparatus for height measurement and baseline determination, based on height of a rolled-steel structural shape and, more particularly, to an apparatus for compensating the tolerance in height of a workpiece, e.g. rolled steel sections. The invention is especially concerned with the use of such a baseline or reference-determining device in a portal drilling apparatus which drills web bores or holes in rolled steel sections whose height may vary within certain tolerances.

BACKGROUND OF THE INVENTION

In this description, reference may be made to "profiles", "rolled steel sections", and like structural elements suitable for use as beams, guiders, columns and the like. While in most cases the structural shapes involved will be those generally described as I-beams, H-beams and flanged beams, in most cases the structural shape will have a web which generally lies horizontally during drilling, will be provided with at least one flange along at least one edge of the web and will be displaced through the machine on a roller conveyer or table in a prone or recumbent position so that the height H of the structural shape is measured horizontally.

The German patent publication-open application DE-OS No. 31 36 394 describes such a drilling apparatus in which the workpiece lies on a roller table with its height extending in horizontal direction.

The drilling apparatus includes a frame with an upright movable in horizontal direction towards the workpiece to define a clamping path in cooperation with movable press rollers which press the workpiece against transport rollers located opposite to the press rollers. The opposite flanges of I-beam and H-beam sections are engaged by these rollers. The movable upright is connected to a stationary upright via a transverse beam along wich a drilling unit is moved. The drilling unit is operated by a control unit so as to be positioned in reference to the centerline of a standard workpiece of nominal or standard height.

For correcting the position of the drilling unit in the event the actual height of the workpiece deviates from the set nominal height a possible shift of the reference line will occur to cause the program of holes to deviate from their desired positions vis-a-vis the reference line. Accordingly, this earlier system uses as its essential element a Bowden cable one end of which is connected to a control cam and whose other end is linked to a double-armed angle lever which is connected to the bearing for the press rollers. The lever assembly transmits the movement of the bearing to the control cam by a ratio of 1:2.

While this principle is sound as the Bowden cable follows the movement of the movable upright and press rollers in accordance with the height tolerance of the rolled steel section during clamping of the latter, the accuracy of transmitting the movement from the bearing to the control cam is not entirely satisfactory so that the web bores provided by the drilling unit on the rolled steel sections do not always correspond to a desired drilling pattern.

Reference is made herein to the centerline as a representative baseline used as a refernce point for control of the drilling pattern. Naturally, the two-to-one transmission ratio between the displacement of the movable upright through the distance $\pm h$ compensating for height variations in the structural section and the correction correspondingly of $\pm h/2$ of the reference position of the drilling head will always automatically align the head with the centerline within the limits of accuracy as noted, but this system is totally unsuited to any other baseline which may be required, such as an edge of the section.

OBJECT OF THE INVENTION

It is thus the principal object of my invention to provide an improved apparatus for compensating the tolerance in height of a workpiece to be treated in a drilling device or the like obviating the afore-stated drawbacks.

Another object of the invention is to so improve the height measurement device of such a portal drill as to ensure improved accuracy in the translation of a measurement of the height variation to a baseline change.

Yet another object of my invention is to provide a device for improved translation of the height tolerance measurement from the measuring unit to the output-/evaluation unit of the system.

SUMMARY OF THE INVENTION

I realize this object according to the invention by providing a transmitting device which includes a crank arm/lever assembly to transmit the movement of the movable upright to a correction unit. In accordance with the clamping path as covered by the movable upright and depending on the height of the respectively treated workpiece, the correction unit acts on the drilling device to provide a drilling pattern exactly aligned to the center of the workpiece and thus allowing the tolerance in height of each workpiece to be automatically taken into account.

In accordance with the teachings of my invention, the trasnmitting device includes a working bar which cooperates with a control lever connected to the movable upright. The working bar is linked via a crank arm to a horizontally extending rotatable rod which via a further crank arm and angle lever is connected to a transmission bar. Linked to the transmission bar is the correction unit. Thus, the horizontal movement of the respective upright is converted via the working bar into a rotation of the rod which causes a linear displacement of the transmission bar and thus a correction of the drilling device.

An advantage of my present invention resides in the fact that all structural elements employed for transmitting the horizontal movement of the upright into a horizontal movement of the transmission bar operate in a tolerance-free manner so that the measured tolerance in height of the rolled steel sections is automatically transmitted to the correction unit without any disturbing inaccuracies.

BRIEF DESCRIPTION OF THE DRAWING

The above and other objects, features and advantages of my present invention will become more readily apparent from the following description, reference being made to the accompanying drawing in which.

SPECIFIC DESCRIPTION

Figure 1:
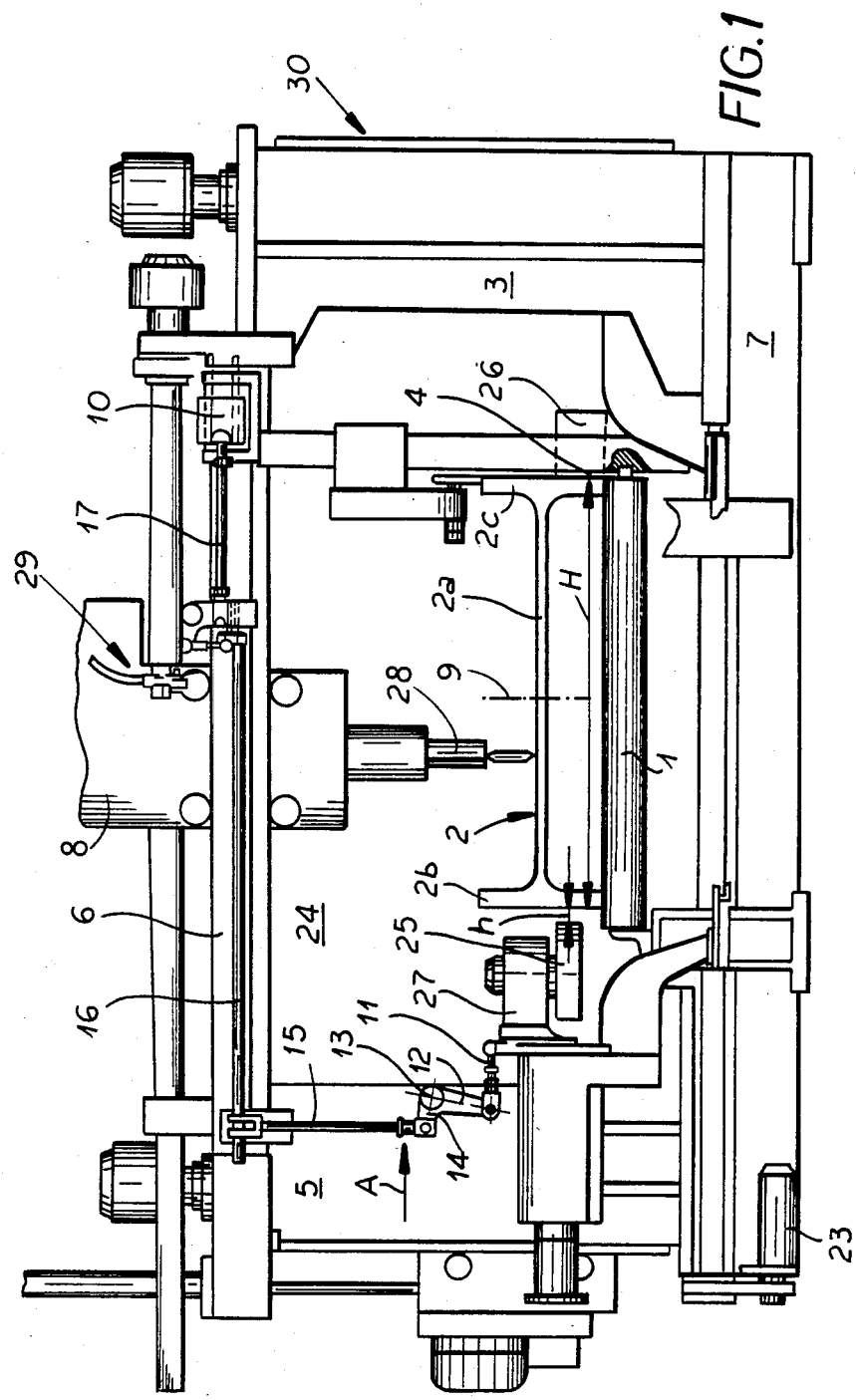
FIG. 1 is a front view of a portal drilling device incorporating one embodiment of an apparatus according to the invention.

In FIG. 1, I have shown a portal drilling apparatus having a frame 30. The frame 30 includes two spaced uprights 3, 5 connected to each other by an upper transverse beam 6 and a lower transverse beam 7 so that an opening 24 is a roller conveyer or table 1 which supports a workpiece 2, e.g. a rolled steel section of double-T-shape or I-beam configuration having a web 2a separating two spaced flanges 2b, 2c.

As can be seen from FIG. 1, the workpiece 2 lies in a horizontal position on the roller table 1 so that its actual height H extends horizontally.

The upright 3 is fixed while the upright 5 is movable in a direction A transverse to the advance movement of the roller table 1. The upright 5 is adjustable in a sensitive manner by a regulating motor 23 which e.g. may be a controllable direct current motor.

Cooperating with the upright 5 are press rollers 25 which are supported by a bearing 27 and engage the flange 2b of the workpiece 2. Opposite the press rollers 25 are transport rollers 26 with fixed angles which define a stop surface 4 for the flange 2c of the workpiece 2 when the latter is clamped between the press rollers 25 and the transport rollers 26.

The upper beam 6 supports a drilling unit 8 which is movable horizontally and transversely to the advance movement of the roller table 1 and includes a drill spindle 28 for providing bores along the web 2a of the workpiece 2.

The drilling unit 8 is controlled by a programmed control unit 29 which positions the drilling unit 8 to provide the web boreholes in accordance with the central axis 9 of a workpiece of nominal height.

As the height of the workpieces, however, varies by certain tolerances and thus the actual height of the workpiece to be treated may differ from the nominal height, a correction unit 10 is arranged which adjusts the drilling unit 8 accordingly.

The measurement of the tolerance in height and its transmittal to the correction unit 10 is based on a determination of the clamping path as covered by the upright 5 and the press rollers 25 in order to clamp the workpiece 2 against the stop surface 4 in comparison to the clamping path for a standard workpiece of nominal height. Upon a deviation of plus/minus h of the clamping path from the clamping path for the nominal height the apparatus according to the invention is dimensioned in such a manner that the position of the baseline or referenceline of the drilling unit 8 is corrected via the correction unit by a value of plus h/2 or minus h/2.

Figure 2:
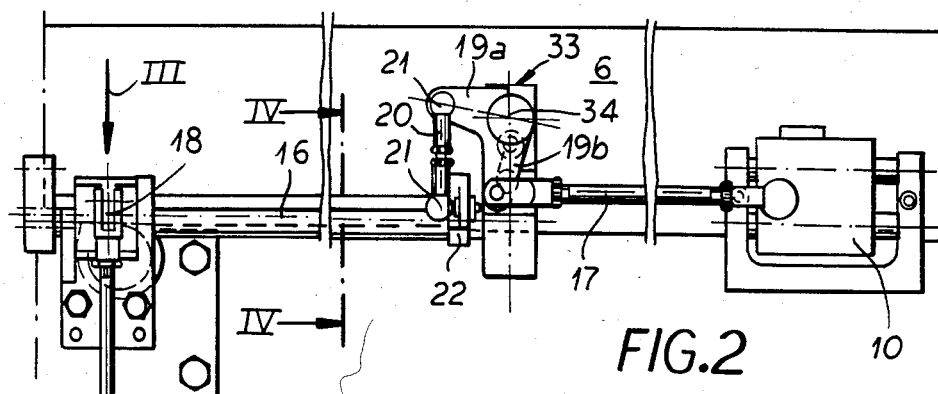
FIG. 2 is a front view of the apparatus of FIG. 1 on a larger scale.
Figure 3:
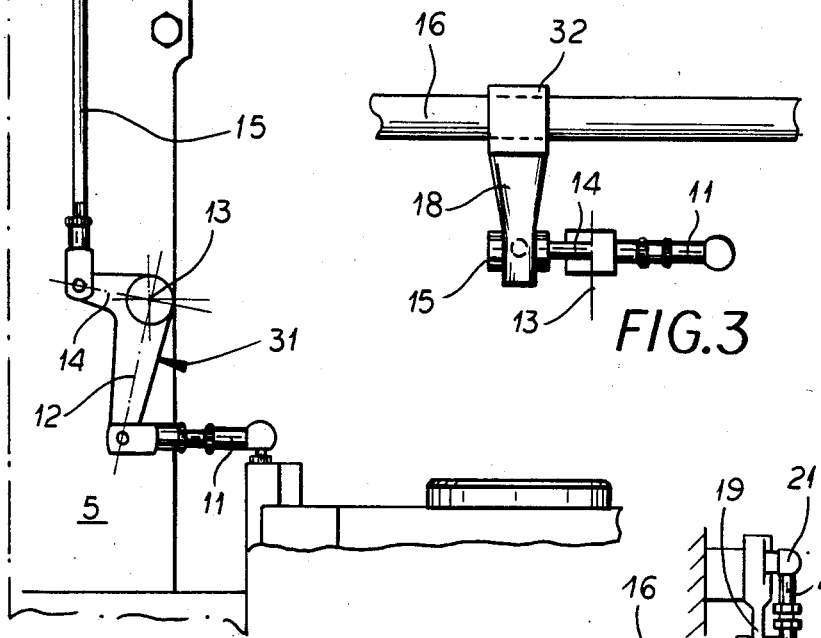
FIG. 3 is a top view of the apparatus taken in the direction of the arrow III in FIG. 2.
Figure 4:
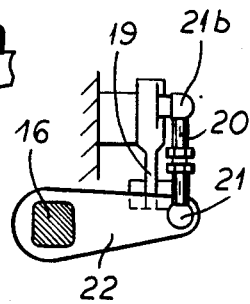
FIG. 4 is a cross sectional view of the apparatus taken along line IV—IV in FIG. 2.

Turning now, in particular to FIGS. 2-4 which shown in greater detail the connection between the rollers 25 and the correction 10. Accordingly, the bearing 27 is connected to one end of a horizontal control lever 11 whose other end is articulated to one lever arm 12 of a double-armed angle or bell-cranked lever 31 which is supported by the upright 5 and pivotally about an axis 13 as indicated by the dash-dotted lines in FIG. 2, this axis is fixed on column 5. The other lever arm 14 of the angle lever 31 is connected to the lower end of a working bar 15 which extends in vertical direction and is supported by the upright 5.

The upper end of the working bar 15 is articulated via a crank arm 18 to a noncircular cross section horizontal rod 16 which is supported by the upper beam 6 and is rotatable in dependence on the vertical displacement of the bar 15.

As is illustrated in FIG. 3, the crank arm 18 is provided in elongation thereof with a block 32 which slides along the horizontal rod 16 during displacement of the upright 5 but does not interfere with the rotation of the rod 16. This is easily achieved by providing the rod 16 with a square (FIG. 4) or hexagon cross section (not shown) and extending in a respectively shaped receiving opening of the block 32.

With its other end the crank is connected to a crank arm 22 which is hinged via a respective joint 21a to one end of a guide rod 20 whose other end is articulated via a joint 21b to one lever arm 19a of a double-armed angle or bell-crank lever 33. The angle lever 33 is pivotally about an axis 34—as indicated by dot-dash lines in FIG. 2—and has another lever arm 19b which is linked to a transmission bar 17 supported by the upper beam 6 and connected to the correction unit 10. Thence, the rotation of the rod 16 is converted into a displacement of the bar 17 in horizontal direction. The connection between the bearing 27 for the rollers 25 and the correction unit 10 via the described lever arrangement is selected in such a manner that the movement of the bearing 27 is transmitted by a ratio of 1:2 to the correction unit 10.

Figure 5:
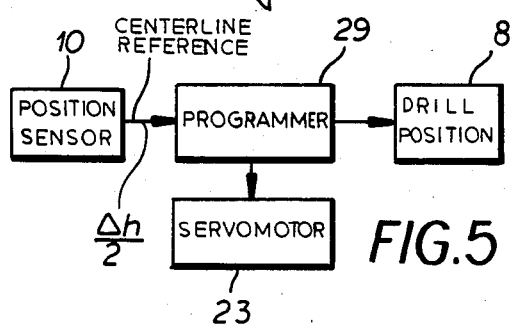
FIG. 5 is a block diagram illustrating principles of the invention.

The apparatus according to the invention as incorporated in a drilling device works as follows:

After the workpiece 2 has been advanced into the portal drill on the roller table 1, the upright 5 is displaced by motor 23 towards the workpiece 2 until the opening 24 and the distance between the transport rollers 26 and the press rollers 25 are set to correspond precisely to the nominal height of a workpiece as given in accordance with roller steel standards plus a clamping path of e.g. 15 mm. The press rollers 25 then are actuated to clamp the workpiece 2 against the stop surface 4 of the transport roller 26, being halted by the controller/programmer 29 (FIG. 5).

The displacement of the rollers 25 is automatically transmitted via the horizontal control bar 11 to the vertical bar 15 which rotates the rod 16. Via the crank arm 22, guide rod 20 and angle lever 33, the rotation of the rod 16 is converted into a linear displacement of the horizontal bar 17 which cooperates with the drilling unit 8 via the correction unit 10. As already mentioned, the movement of the upright 5 is transmitted via the described intermediate crank arm/lever assembly with a lever ratio of 1:2 to the correction unit 10.

Consequently, when the actual height of the workpiece 2 supported on the roller table 1 differs from the given nominal height of the standard workpiece 2, the clamping path as covered by the upright 5 and the rollers 25 is different so that the position of the drilling unit 8 is corrected by the correction unit 10 which acts on the control unit 29 for the drilling unit 8. In the event of a plus tolerance between the flanges 2b and 2c which means that the actual height exceeds the nominal height, the clamping path is shorter than 15 mm so that the drilling unit will not reach its normal position. In case the actual height indeed corresponds to the nominal height, the clamping path is precisely 15 mm in which case the drilling unit 8 will occupy its normal position. In the event of a minus tolerance, i.e. the actual height is smaller than the nominal height, the clamping path exceeds 15 mm so that the drilling unit 8 is displaced beyond the normal position. Depending on the actual height of the workpiece 2, the reference point for the drilling unit 8 is modified so that the drilled web boreholes are positioned exactly with respect to the actual center of the treated workpiece 2.

By providing a suitable switching mechanism, the control unit 29 can selectively be switched to cause the drilling unit 8 to provide web boreholes positioned with respect to the center of the workpiece 2 or to its outer side. It is certainly possible to use different reference points selectively during a treatment of the workpiece so that drilling patterns are obtained which on the one hand refer to the center and on the other hand refer to an outer side or outer edge of the workpiece.

We claim:

1. An apparatus for compensating for tolerance in height of a workpiece in a drilling machine which includes a frame with two spaced uprights and a transverse beam connecting said uprights with each other, one of the uprights being movable in a horizontal direction toward the workpiece to define a clamping path, a drilling unit being movable along said transverse beam to drill bores in said workpiece at locations determined relative to a baseline of a standard workpiece of a nominal height, said apparatus comprising:

measuring means for determining the actual clamping path covered by said movable one of said uprights during clamping of said workpiece, said measuring means including:
a bell-crank lever fulcrummed on said one of said uprights, and
a control bar on said one of said uprights pivotally connected to one arm of said lever;
a correction unit responsive to determination of said actual clamping path by said measuring means for adjusting the position of said drilling unit by a value of $+h/2$ or $-h/2$ upon a deviation of h of the measured actual clamping path from the clamping path for said standard workpiece of nominal height; and
transmitting means operatively connecting said lever of said measuring means with said correction unit and including:
a working bar pivotally connected to another arm of said lever,
a rotatable rod extending along said transverse beam perpendicularly to said working bar,
a crank arm connecting said working bar to said rotatable rod so that a linear displacement of said working bar is converted into a rotation of said rod, said crank arm being so connected to said rotating rod that it can slide along said rod upon movement of said one upright,
a double-arm angle lever,
a guide rod articulatedly connecting one arm of said angle lever with said crank arm, and
a transmission bar linked to said correction unit and pivotally connected to the other arm of said angle lever so as to be operatively connected to said rotating rod so that a rotation of the latter is converted into a linear movement of said transmission bar.

* * * * *